United States Patent
Grosso et al.

(10) Patent No.: US 8,687,927 B2
(45) Date of Patent: Apr. 1, 2014

(54) FIBER BRAGG GRATING HYDROPHONE COMPRISING A DIAPHRAGM AMPLIFIER

(75) Inventors: Gilles Grosso, Six Fours les Plages (FR); Frédéric Mosca, Marseilles (FR)

(73) Assignee: IXBLUE, Marly le Roi (FR)

( * ) Notice: Subject to any disclaimer, the term of this patent is extended or adjusted under 35 U.S.C. 154(b) by 129 days.

(21) Appl. No.: 13/375,037

(22) PCT Filed: May 27, 2010

(86) PCT No.: PCT/FR2010/051016
§ 371 (c)(1), (2), (4) Date: Nov. 29, 2011

(87) PCT Pub. No.: WO2010/136723
PCT Pub. Date: Dec. 2, 2010

(65) Prior Publication Data
US 2012/0093463 A1 Apr. 19, 2012

(30) Foreign Application Priority Data
May 29, 2009 (FR) ...................................... 09 53575

(51) Int. Cl.
*G02B 6/26* (2006.01)
*G02B 6/34* (2006.01)

(52) U.S. Cl.
USPC ............................................. 385/13; 385/37

(58) Field of Classification Search
USPC ...................................................... 385/13, 37
See application file for complete search history.

(56) References Cited

U.S. PATENT DOCUMENTS

| | | | | |
|---|---|---|---|---|
| 3,660,809 A | * | 5/1972 | Pearson | 367/152 |
| 4,545,253 A | * | 10/1985 | Avicola | 73/655 |
| 5,311,485 A | * | 5/1994 | Kuzmenko et al. | 367/149 |
| 5,363,342 A | * | 11/1994 | Layton et al. | 367/149 |
| 6,160,762 A | | 12/2000 | Luscombe | |
| 6,160,763 A | * | 12/2000 | Cole | 367/173 |
| 6,175,108 B1 | | 1/2001 | Jones | |

(Continued)

FOREIGN PATENT DOCUMENTS

| | | |
|---|---|---|
| EP | 1310801 | 5/2003 |
| FR | 2562741 | 10/1985 |
| GB | 2145237 | 3/1985 |

OTHER PUBLICATIONS

International search report dated Sep. 21, 2010 in corresponding PCT/FR2010/051016.

*Primary Examiner* — Charlie Peng
(74) *Attorney, Agent, or Firm* — Young & Thompson

(57) ABSTRACT

A fiber Bragg grating hydrophone includes a fluid chamber (1) and an optical fiber (2) in which a Bragg grating (3) is integrated, the optical fiber extending through the fluid chamber such that the Bragg grating is positioned inside the latter. The fluid chamber is filled with a compressible fluid and is defined by a rigid casing (4) including two end surfaces (28*a*, 28*b*) that are rigidly connected to the optical fiber. At least one of the two end surfaces of the rigid casing includes an opening (5*a*, 5*b*) closed by a deformable diaphragm (6*a*, 6*b*) that is rigidly connected to the optical fiber and that can be deformed in reaction to a difference in the pressures applied to the surfaces thereof, thereby modifying the length of the optical fiber as measured by a variation in the wavelength of a luminous flux extracted from the optical fiber.

13 Claims, 3 Drawing Sheets

(56) References Cited

U.S. PATENT DOCUMENTS

2002/0154860 A1* 10/2002 Fernald et al. .................. 385/37
2004/0202401 A1* 10/2004 Berg et al. ...................... 385/12
2004/0237648 A1   12/2004 Jones
2012/0082415 A1*  4/2012 Grosso et al. ................... 385/37

* cited by examiner

FIBER BRAGG GRATING HYDROPHONE COMPRISING A DIAPHRAGM AMPLIFIER

BACKGROUND OF THE INVENTION

1. Field of the Invention

The present invention relates to the field of the acoustic pressure measurement, in particular in underwater environment.

2. Description of the Related Art

The acoustic sensors such as the hydrophones are conventionally used in an underwater environment to detect acoustic pressure variations that may be caused by seismic waves, by the presence of sea mammals or ships, for example.

They may be used in a static configuration and be deployed on the sea bottom to carry out an acoustic monitoring, or may be towed by a ship or a submarine.

Most of the known acoustic sensors are based on the use of piezoelectric components whose deformation causes a pressure variation that can be measured electronically.

However, such sensors require a local installation, which make them difficult to use for the towed applications, as a seismic sensor for example. Moreover, the piezoelectric components are sensitive to the electromagnetic disturbances.

To remedy these drawbacks, there exist optical fibre hydrophones of the DFB FL type ("Distributed Feedback Fibre Laser") comprising a Bragg grating, and which have the property to emit very fine wavelengths sensitive to the mechanical stress applied to the optical fibre. Measuring these variations of emitted wavelengths makes it possible to deduce the stress applied to the optical fibre and thus the external pressure.

This type of acoustic sensor present advantages such as the absence of electronic components in the immerged part, which make them easier to tow, and the possibility to multiplex several sensors on a same fibre.

However, these optical fibre sensors have an insufficient sensitivity for the detection of low variations of pressure.

To amplify these low variations of pressure, it is known to mechanically amplify the mechanical stress applied to the optical fibre.

Optical fibre sensors comprise an optical fibre surrounded with a cylinder made of elastomeric resin, so as to increase the stresses at the optical fibre by applying shear stresses to the optical fibre generated by the elastic cylinder.

However, such technology does not make it possible to reach the required sensitivities for the detection of small variations of acoustic pressure. Moreover, the Bragg grating being encapsulated in the resin, its operation is modified and its laser frequency decreases.

The document WO 2006/034538 discloses an optical fibre fastened to a flexible support. The latter makes it possible to amplify the acoustic signals.

There also exist acoustic sensors of the "toothpaste tube" type, including an optical fibre provided with a Bragg grating surrounded with a deformable casing filled with an incompressible fluid. The laser fibre is integral with the ends of the deformable casing.

The drawback of these prior art solutions lies in that they provide too low sensitivities to the external pressure.

BRIEF SUMMARY OF THE INVENTION

The applicant has thus tried to develop a Bragg grating fibre hydrophone having an improved sensitivity with respect to the known hydrophones.

Such a device is provided according to the invention.

The invention relates to a Bragg grating fibre hydrophone comprising a fluid cavity, and an optical fibre in which a Bragg grating is integrated, wherein said optical fibre extends through said fluid cavity in such a manner that said Bragg grating is positioned inside the latter.

According to the invention:

said fluid cavity is filled with a compressible fluid and is delimited by a rigid casing comprising two end faces integral with the optical fibre, at least one of the two end faces of the rigid casing comprises an opening closed by a deformable diaphragm integral with said optical fibre, wherein said deformable diaphragm is capable of being deformed by a difference in the pressures applied to its faces, causing a length variation of the optical fibre measured by a variation of wavelength of a luminous flux extracted from the optical fibre.

The invention thus provides a Bragg grating fibre hydrophone with an improved sensitivity with respect to the known hydrophones, and making it possible to reach gains higher than 1 000.

In various possible embodiments, the device of the invention may also be defined by the following characteristics, which may be considered either alone or in any technically possible combination thereof, and which each provides specific advantages:

the two end faces of the rigid casing each comprise an opening closed by a deformable diaphragm integral with said optical fibre, said optical fibre is a pre-stressed optical fibre, wherein the tension of said optical fibre is held by holding means, with said holding means leaning on each of the end faces of the rigid casing, respectively, the holding means are arranged outside the fluid cavity, wherein each holding means has a first end integral with the rigid casing and a second end which is passed through by the optical fibre and integral with the latter, the Bragg grating fibre hydrophone comprises at least one hydrostatic filter cooperating with the fluid cavity, wherein each hydrostatic filter is provided with an orifice capable of providing a fluid communication between the inside and the outside of the fluid cavity, each hydrostatic filter is associated with one of the deformable diaphragms, wherein each hydrostatic filter includes a tank delimited by a deformable outer casing and by one of the end faces of the rigid casing, said tank being in fluid communication with the fluid cavity, through said orifice extending through the deformable diaphragm, said deformable outer casing being tightly fastened to the rigid casing.

The hydrostatic filter makes it possible to pressure compensate the hydrophone during static pressure (immersion) or temperature variations. During a slow variation of pressure or temperature, a flow is established between the fluid cavity and the tank, aiming to balance the internal and external pressures. The very low frequencies are therefore filtered out. The orifice size of the hydrostatic filter determines the low cut-off frequency and thus the low limit of the working band of the hydrophone.

The hydrophone is usable within a wide acoustic frequency range, between 0.4 Hz and 10 kHz.

When the hydrophone is immerged in an underwater environment, and used in a static configuration, the hydrostatic filters make it possible to attenuate the effects of waves and swell.

the section of the deformable diaphragms is smaller than that of the deformable casing of the hydrostatic filters, the elements forming said hydrophone have a resonance frequency outside the frequency range comprised between 0.4 Hz and 10 kHz.

the Bragg grating fibre hydrophone comprises a flexible and tight outer casing, surrounding the unit formed by the rigid casing and the hydrostatic filters, wherein said outer casing is filled with a fluid so as to transmit the pressure variations external to said fluid cavity, the compressible fluid of the fluid cavity has a compressibility modulus lower than 1.5 Gpa, preferably lower than 0.5 GPa.

BRIEF DESCRIPTION OF THE DRAWINGS

The invention will be described in more detail with reference to the appended drawings, in which.

DETAILED DESCRIPTION OF THE PREFERRED EMBODIMENTS

Figure 1:
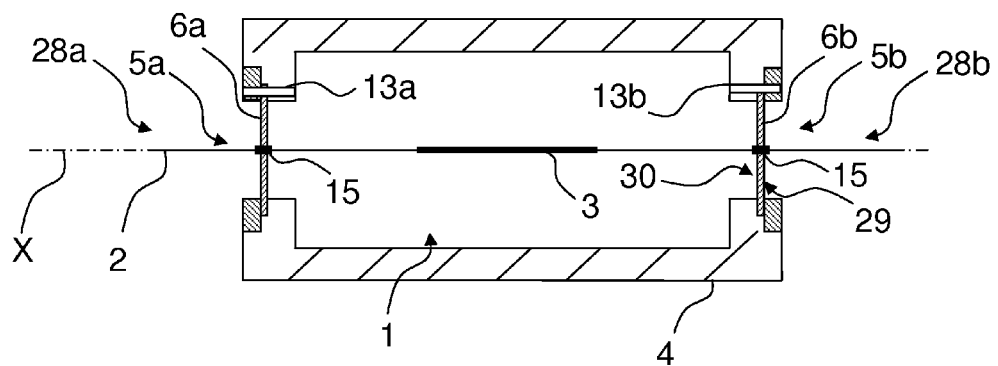
FIG. 1 shows a longitudinal cross-section of a Bragg grating fibre hydrophone, according to a possible embodiment of the invention.

FIG. 1 shows the detail of a Bragg grating fibre hydrophone, according to a possible embodiment of the invention.

The Bragg grating fibre hydrophone comprises an optical fibre 2 and a fluid cavity 1 filled with a compressible fluid. The fluid cavity 1 is delimited by a rigid casing 4 comprising two end faces 28a, 28b, integral with the optical fibre 2, and opposite to each other.

At least one of the two end faces 28a, 28b of the rigid casing 4 comprises an opening 5a, 5b closed by a deformable diaphragm 6a, 6b integral with the optical fibre 2.

In the example of FIG. 1 and in the other following examples, the two end faces 28a, 28b of the rigid casing 4 are formed by an opening 5a, 5b closed by a deformable diaphragm 6a, 6b integral with the optical fibre 2.

A Bragg grating 3 is integrated in the optical fibre 2, forming a laser cavity. The Bragg grating 3 may be photo-inscribed in the optical fibre 2. The optical fibre 2 extends through the fluid cavity 1 along a longitudinal axis (X) in such a manner that the Bragg grating 3 is positioned inside the latter.

In this example, the optical fibre 2 has a sensitivity comprised between 3 and 4.5 nm/MPa, a diameter of 125 μm, and a Young modulus comprised between 50 GPa and 90 GPa, preferably equal to 70 GPa.

The two openings 5a, 5b are opposite to each other, and separated from each other by the Bragg grating 3.

The deformable diaphragms 6a, 6b are passed through by the optical fibre 2, and are integral with the latter.

The deformable diaphragms 6a, 6b may be fastened to the optical fibre 2 by welding or bonding, for example. The welding may be a laser welding with or without a ferule. The bonding may be a polyamide coating or epoxy adhesive bonding.

The deformable diaphragms 6a, 6b are capable of being deformed by a difference in the pressures applied to its faces, causing a length variation of the optical fibre 2 measured by a variation of wavelength of a luminous flux extracted from the optical fibre 2. More precisely, this is the length variation of the laser cavity that is measured.

The relation between the wavelength and pressure variations is expressed as follows:

$$\Delta\lambda = S_{opt} G_{meca} \Delta P$$

where $\Delta P$ is the pressure applied to the structure, $S_{opt}$ is the sensitivity of the "bare" Bragg grating, and $G_{meca}$ is the desired mechanical gain.

The optical pumping of the optical fibre 2 may be performed by a laser diode at 980 nm, for example. The luminous flux extracted from the optical fibre 2 has a wavelength that is a function of the lengthening or the shortening of the optical fibre 2. The wavelength variations are measured by a Mach Zehnder interferometer, for example.

When the external pressure $P_e$, i.e. the pressure external to the fluid cavity 1, varies, the deformable diaphragms 6a, 6b are deformed and the rigid casing 4 is not or almost not deformed.

When the external pressure $P_e$ is higher than the internal pressure $P_i$, the deformable diaphragms 6a, 6b are deformed and curved toward the inside of the fluid cavity 1, causing a shortening of the optical fibre 2 or laser cavity.

The external pressure $P_e$ is applied to the outer face 29 of the deformable diaphragms 6a, 6b, while the internal pressure $P_i$ is applied to the inner face 30 of the deformable diaphragms 6a, 6b.

And conversely, when the external pressure $P_e$ is lower than the internal pressure $P_i$, the deformable diaphragms 6a, 6b are deformed and curved toward the outside of the fluid cavity 1, causing a lengthening of the optical fibre 2.

The length of the hydrophone is shorter than the acoustic wavelengths measured. The pressure field is supposed to be homogeneous.

Consequently, in static configuration, the deformable diaphragms 6a, 6b are simultaneously deformed, in opposite directions.

The deformable diaphragms 6a, 6b may be made of metal or polymer, for example. They may be made of bronze or brass.

The deformable diaphragms 6a, 6b and the rigid casing 4 delimit the fluid cavity 1 and form a tight unit.

In the example of FIGS. 1 to 5, the rigid casing 4 has a tubular shape. The rigid casing 4 has the highest possible Young modulus, higher than 100 GPa.

The rigid casing 4 has to be the less deformable possible. The rigid casing 4 may be made of titanium, for example, with a Young modulus of 120 GPa. The openings 5a, 5b of the rigid casing 4 and the deformable diaphragms 6a, 6b have a circular shape.

The compressible fluid of the fluid cavity 1 has a compressibility modulus lower than 1.5 Gpa.

The compressible fluid may be based on fluorocarbon, as for example perfluorohexane ($C_6F_{14}$), which has a compressibility modulus of 1 GPa.

In the example of FIGS. 1 to 5, the fluid used is inert fluorine provided by the 3M company.

Figure 3:
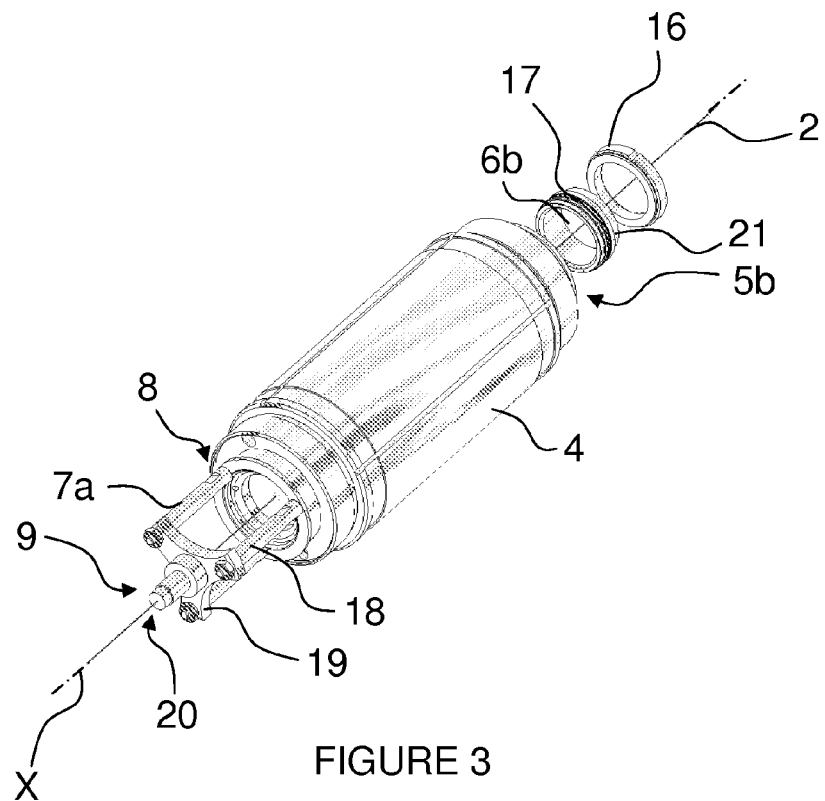
FIG. 3 shows a perspective view of the hydrophone with the holding means.

In a possible example of assembling illustrated in FIG. 3, the deformable diaphragms 6a, 6b are integral with an annular part 21 so as to form a sleeve.

This sleeve is inserted into one of the openings 5a, 5b of the rigid casing 4, so as to tightly close it up. An O-ring 17 may be provided between the annular part 21 and the wall of the rigid casing 4 delimiting one of the openings 5a, 5b, to ensure the tightness. A locking nut 16 locks the sleeve longitudinally against a part of the rigid casing 4 forming a stop.

Once the two deformable diaphragms 6a, 6b are assembled, the optical fibre 2 is threaded into the latter, so as to go through the rigid casing 4 along the main axis (X).

In this example in which the rigid casing 4 has a tube shape, the main axis (X) is a longitudinal central axis. The optical fibre 2 passes through the centre of the deformable diaphragms 6a, 6b.

The principle of operation of the Bragg grating or laser fibre hydrophone is based on the lengthening of a laser cavity (Bragg grating 3).

The geometry of the Bragg grating 3 and the index of the medium determine the resonance frequency of the laser cavity, and thus the wavelength thereof. The radial pressure applied to the laser cavity modifies the geometry thereof and induces stresses in the silica of the fibre. The lengthening and the stress level in the laser cavity modify the geometry and the medium's index, respectively. These modifications induce a variation of the resonance frequency, thus of the laser wavelength. The optical fibre hydrophone uses this property for detecting the acoustic waves.

The sensitivity of the hydrophone is characterized by the ratio $$\frac{\varepsilon_x}{P_e},$$

where $\varepsilon_x$ is the axial lengthening of the optical fibre (laser cavity) and $P_e$ is the external pressure. In the case of the fibre alone, the theoretical sensitivity is $$\frac{\varepsilon_x}{P_e} = 2\frac{v}{E} = 4.7 * 10^{-12},$$

where E and v are the Young modulus and the Poisson ratio of the silica, respectively.

The deformable diaphragms 6a, 6b, the compressible fluid and the rigid casing 4 form a mechanical amplifier for increasing this sensitivity to the external pressure $P_e$.

Such amplifier permits to amplify the axial deformations, while the radial deformations remain very low.

During the hydrophone operation, a low-frequency acoustic wave causes a local variation of the pressure around the hydrophone.

The external pressure ($P_e$) thus becomes different from the pressure ($P_i$) within the fluid cavity 1.

The fluid cavity 1, via its compressibility, tends to balance its pressure with the external pressure by a variation of its volume:

$$-\frac{1}{\chi_s}\frac{dV}{V} = (Pe - Pi)$$

where $\chi_s$ is the adiabatic compressibility of the fluid, V is the volume of the fluid cavity 1, and dV is the variation of volume of the cavity.

The hydrophone geometry forces the optical fibre 2 to deform axially.

The volume variation takes the form:

$$dV = dx * S_{ax} + (\pi R^2 - \pi(R + dr)^2)l$$

where $S_{ax}$ is the effective surface of the diaphragm 6a, 6b, R is the inner radius of the rigid casing 4, and l is the length of the rigid casing 4.

Wherein:

$$dx = \frac{P * S_{ax}}{k_{ax}} \text{ and } dr = \frac{P * S_r}{k_{rad}}$$

where $k_{ax}$ and $k_{rad}$ are the axial and radial stiffness of the system, respectively, $S_r$ is the inner radial surface of the rigid casing 4, and P is the incident pressure.

$k_{rad}$ mainly depends on the type of material of the rigid casing 4. $k_{ax}$ depends both on the properties and size of the diaphragm 6a, 6b, and on the stiffness of the fluid cavity 1.

Such a system directs the deformations in the axial direction by: $k_{ax} \ll k_{rad}$.

An optimum is to be determined for maximizing the deformation gain. The latter may be written as follows:

$$G = \frac{A}{B\frac{S}{V} + \frac{C}{S^2}}$$

where A, B and C are constants, V is the volume of the fluid cavity 1, and S is the section of the diaphragm 6a, 6b.

The gain may also be expressed as the ratio between the axial deformation of the optical fibre due to the mechanical amplifier and the axial deformation of this fibre due to the pressure to the latter, in bare state.

The following embodiment gives an example of possible sizes for the hydrophone.

The rigid casing 4 may have a length of 250 mm, with an inner diameter of 30 mm and an outer diameter of 35 mm. The distance between the two deformable diaphragms 6a, 6b may be of 70 mm, their thickness of 0.1 mm, and their diameter of 22 mm. The optical fibre may have a diameter of 125 μm, and the Bragg grating 3 may extend over a length of 50 mm. The compressibility modulus of the compressible fluid may be of 1 Gpa. These parameters make it possible to reach a gain of 1700.

The two deformable diaphragms 6a, 6b have the lowest Young modulus possible, lower than 100 Gpa.

Other dimensions are also possible, providing different gains.

Generally, the hydrophone according to the invention makes it possible to reach gains higher than 1 000.

Figure 2:
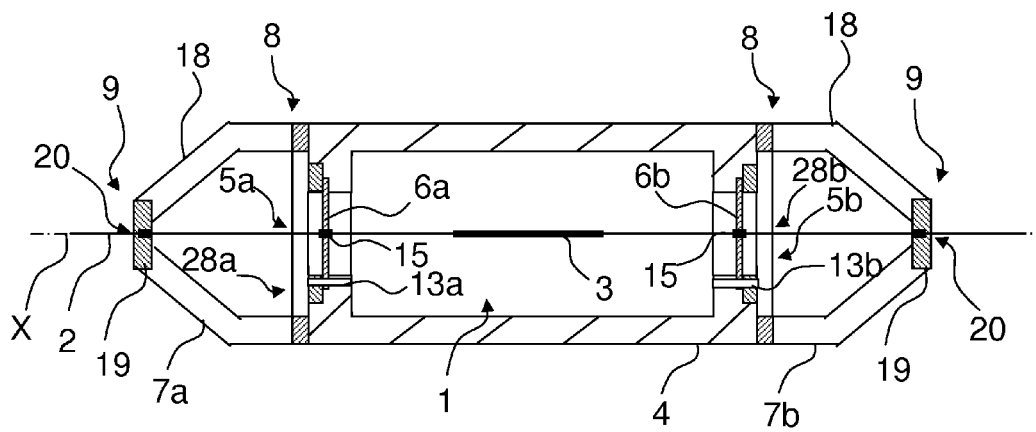
FIG. 2 shows a longitudinal cross-section of the hydrophone with holding means.
Figure 4:
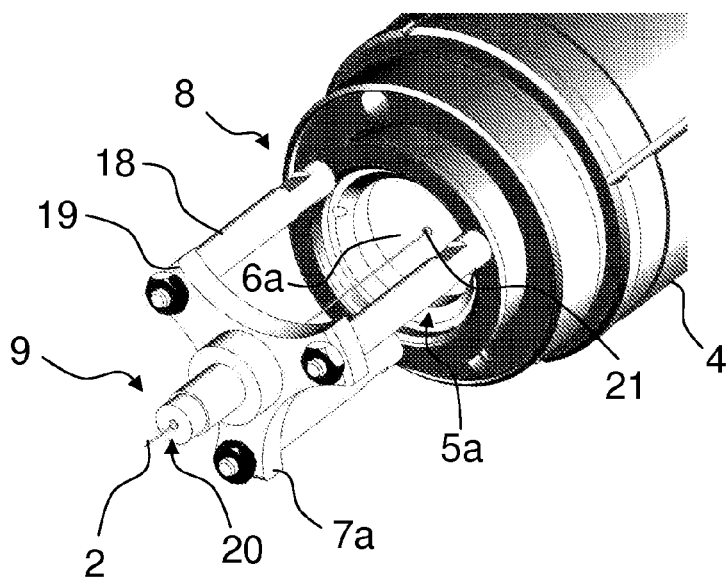
FIG. 4 shows the detail of the holding means.

The optical fibre 2 is a pre-stressed optical fibre. As illustrated in FIGS. 2 and 4, the tension of the optical fibre 2 is held by holding means 7a, 7b, arranged on either side of the fluid cavity 1, and fastened to each of the end faces 28a, 28b of the rigid casing 4.

These holding means 7a, 7b are arranged in front of each of the openings 5a, 5b of the rigid casing 4, and outside the fluid cavity 1. Each holding means 7a, 7b has a first end 8 integral with the rigid casing 4 and a second end 9 which is passed through by the optical fibre 2 and integral with the latter.

In the examples of FIGS. 2 to 4, the holding means 7a, 7b lean on the end sides of the rigid casing 4. They comprise three tabs 18 having each a first end fastened to one end side of the rigid casing 4 and a second end fastened to a three-leg support 19, ended by a holding ring provided with an orifice 20 at the centre thereof. This orifice 20 is provided for the optical fibre 2 to pass through and to be fastened.

Once the mechanical amplifier is assembled, the optical fibre 2 is threaded into the orifice 15 provided in the deformable diaphragm 6a, 6b, so that the Bragg grating 3 is located at the centre of the fluid cavity 1.

The optical fibre 2 is then fastened to the second end 9 of one of the holding means 7a, 7b, by welding or bonding.

Once the optical fibre 2 is fastened on one side, a calibrated pre-stress is applied on the other side, by pulling the optical fibre 2.

The optical fibre 2 being tensioned, it is welded or bonded to the second end 9 of another holding means 7a, 7b.

The pre-stress being permanent, the optical fibre 2 is fastened to the two deformable diaphragms 6a, 6b by laser bonding or welding.

That way, a perfect balance of the tension of the optical fibre 2 on each side of the deformable diaphragms 6a, 6b is obtained.

The optical fibre 2 is then cut and butt jointed on either side with a cladded optical fibre.

The holding means 7a, 7b make it possible to avoid the optical fibre 2 to fold over itself during a strong acoustic pressure.

The pre-stress applied to the optical fibre 2 is calculated to be higher than the maximum deformations the device will be capable of tolerating. Therefore, the optical fibre 2 will always be tensioned during the hydrophone operation.

Such arrangement makes it possible to maximally reduce the stiffness of the mechanical amplification system. The amplification functions and the pre-stress strength are dissociated from each other.

The maximum pre-stress that can be applied to the fibre is 2N, which corresponds to a maximum stress of $$\sigma = \frac{F}{S_{fibre}} = 1.63 \cdot 10^8 \, Pa,$$

for an optical fibre 2 of diameter 125 μm.

The Young modulus of the optical fibre 2 being of 70 GPa, the maximum expansion operating deformation of the optical fibre 2 is thus:

$$\varepsilon_{pc} = \frac{\sigma}{E} = 2.3 \cdot 10^{-3}.$$

The maximum operating acoustic pressure of the hydrophone is thus:

$$P_{max} = \frac{\varepsilon_{pc}}{\varepsilon_{1Pa}} = \frac{\varepsilon_{pc}}{G \cdot \varepsilon_{ref}} = \frac{2.3 \cdot 10^{-3}}{4.72 \cdot 10^{-9}} = 4.87 \text{ bar}.$$

That is to say a maximum operating acoustic pressure of:

$$S_{max} = 20 \, \log_{10}\left(\frac{P_{max}}{P_{ref}}\right) = 20 \, \log_{10}\left(\frac{4.87 \cdot 10^5}{1.10^{-6}}\right) = 234 \text{ dB}$$

Figure 5:
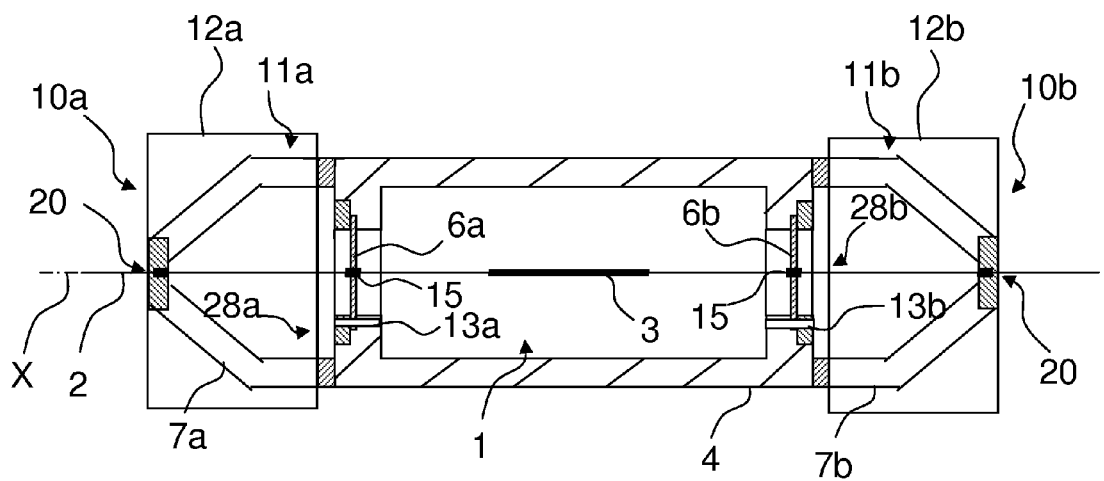
FIG. 5 shows a longitudinal cross-section of the hydrophone with hydrostatic filters.

As illustrated in FIG. 5, the Bragg grating fibre hydrophone comprises at least one hydrostatic filter 10a, 10b, associated with one deformable diaphragm 6a, 6b of the rigid casing 4, respectively. Each hydrostatic filter 10a, 10b has a tank 11a, 11b delimited by a deformable outer casing 12a, 12b and by one of the deformable diaphragms 6a, 6b of the mechanical amplifier.

The tank 11a, 11b is in fluid communication with the fluid cavity 1 by means of an orifice 13a, 13b extending through each deformable diaphragm 6a, 6b. The deformable casing 12a, 12b is tightly fastened to the rigid casing 4, and covers the holding means 7a, 7b associated with the deformable diaphragm 6a, 6b.

In the example of FIG. 5, the Bragg grating fibre hydrophone comprises two hydrostatic filters 10a, 10b, arranged on either side of the rigid casing 4.

The deformable outer casing 12a, 12b of the hydrostatic filter 10a, 10b has a cap shape and may be made of polymer, for example.

The tanks 11a, 11b and the fluid cavity 1 are filled with the same compressible fluid.

Each deformable outer casing 12a, 12b transmits the pressure variations to one deformable diaphragm 6a, 6b, respectively, by means of the compressible fluid.

The orifices 13a, 13b of the hydrostatic filters 10a, 10b have a diameter comprised between 100 μm and 20 μm, preferably equal to 50 μm.

The hydrostatic filters 10a, 10b make it possible to place the inner fluid at the hydrostatic pressure after a slow pressure variation following a change of temperature or immersion. Therefore, it is possible to free from the hydrostatic pressure and to take into account only the pressure variations around this pressure. It is to be noted that these hydrostatic filters represent a limitation for the detection of very low frequencies. Indeed, the time of reaction of the hydrostatic filter will determine the lowest frequency that can be measured by the hydrophone. The hydrostatic filters are high-pass filters. Therefore, if the frequency of the acoustic wave is lower than the cut-off frequency of the hydrostatic filter, it will be without effect on this acoustic wave.

The very low frequencies are filtered out by this method. The hole size of the hydrostatic filters determines the low cut-off frequency, and thus the low limit of the working band of the hydrophone. The smaller the orifice 13a, 13b is, the lower the cut-off frequency is.

The cut-off frequency is lower than 10 Hz, preferably equal to 0.4 Hz.

The hydrophone makes it possible to detect acoustic waves in the frequency band comprised between 0.4 Hz and 10 kHz.

The elements forming the hydrophone, as for example the deformable diaphragms 6a, 6b, the rigid casing 4 and the optical fibre 2, have a resonance frequency outside the frequency range from 0.4 Hz to 10 kHz.

The section of the deformable diaphragms 6a, 6b is smaller than that of the deformable casing 12a, 12b of the hydrostatic filters 10a, 10b.

The diameter of the deformable diaphragms 6a, 6b is lower than the inner diameter of the rigid casing 4, taken apart from the ends of the rigid casing 4.

The orifices 13a, 13b of the hydrostatic filters 10a, 10b make it possible to perform a pressure balance between the inside of the rigid casing 4 and the inside of the tanks 11a, 11b of the hydrostatic filters 10a, 10b, and a temperature compensation, making the hydrophone insensitive to the slow variations of pressure and temperature during immersions of the hydrophone at variable depths.

When the hydrophone is immerged in an underwater environment, and used in a static configuration, the hydrostatic filters 10a, 10b make it possible to attenuate the effects of waves and swell.

The deformable outer casings 12a, 12b of the hydrostatic filter 10a, 10b are tightly fastened to the rigid casing 4 by clamping rings (not shown).

The Bragg grating fibre hydrophone comprises support frameworks fastened to either side of the rigid casing 4, at the ends thereof (not shown). These support frameworks have a tubular shape and comprise three side openings.

These support frameworks comprise one end linked to one the ends of the rigid casing 4 and another end closed by a plug, provided with a central orifice forming a passageway for the optical fibre(s) 2 (not shown). This plug may be made of Ertalyte, for example.

Grooves may be provided in the outer surface of the rigid casing 4 to accommodate external optical fibres that may be connected to other acoustic pressure sensors, for example.

An elastomeric cap (not shown) may be provided at the output of the central orifice of the plug, to protect the optical fibre(s).

The Bragg grating fibre hydrophone may comprise a flexible and tight outer casing (not shown), surrounding the unit formed by the rigid casing 4, the hydrostatic filters 10a, 10b, and the support frameworks. The outer casing is cylindrical and filled with a fluid so as to transmit the pressure variations external to said fluid cavity 1.

This fluid may be castor oil, for example. The outer casing may be made of polymer, for example Hypalon®.

Therefore, the invention provides a hydrophone that makes it possible to reach high gains, higher than 1 000, and thus acoustic sensitivities higher than those reached by the known hydrophones.

Moreover, due to the fact that the diaphragms are deformable in the same direction, the hydrophone is insensitive to the accelerometer noise when it is towed by a ship or a submarine.

The invention claimed is:

1. A Bragg grating fiber hydrophone, the Bragg grating fiber hydrophone comprising:
    a fluid cavity; and
    an optical fiber in which a Bragg grating is integrated, the optical fiber extending through the fluid cavity such that the Bragg grating is positioned inside the fluid cavity,
    wherein the fluid cavity is filled with a compressible fluid and is delimited by a rigid casing extending along a longitudinal axis, the rigid casing comprising two end faces each comprising an opening closed by a deformable diaphragm fastened to the optical fiber, the rigid casing having a length such that a length of the hydrophone is shorter than acoustic wavelengths that are measured,
    the optical fiber extends through the fluid cavity along the longitudinal axis of the rigid casing, the optical fiber being longitudinally a pre-stressed optical fiber, tension of the optical fiber being held by a holding means that is leaning on each of the end faces of the rigid casing, respectively,
    the deformable diaphragm is configured to be deformed by a difference in pressures applied to faces of each of the deformable diaphragms, causing a length variation of the optical fiber measured by a variation of wavelength of a luminous flux extracted from the optical fiber, and
    the hydrophone is usable within an acoustic frequency range between 0.4 Hz and 10 kHz.

2. The Bragg grating fiber hydrophone according to claim 1, wherein the holding means are arranged outside the fluid cavity, each holding means having a first end integral with the rigid casing and a second end which is passed through by the optical fiber and integral with the optical fiber.

3. The Bragg grating fiber hydrophone according to claim 1, further comprising at least one hydrostatic filter cooperating with the fluid cavity, each hydrostatic filter being provided with an orifice configured to provide a fluid communication between an inside and an outside of the fluid cavity.

4. The Bragg grating fiber hydrophone according to claim 3, wherein each hydrostatic filter is associated with one of the deformable diaphragms, each hydrostatic filter including a tank delimited by a deformable outer casing and by one of the end faces of the rigid casing, the tank being in fluid communication with the fluid cavity through the orifice extending through the deformable diaphragm, the deformable outer casing being tightly fastened to the rigid casing.

5. The Bragg grating fiber hydrophone according to claim 4, wherein a section of the deformable diaphragms is smaller than that of the deformable outer casing of the hydrostatic filters.

6. The Bragg grating fiber hydrophone according to claim 1, wherein elements forming the hydrophone have a resonance frequency outside a frequency range comprised between 0.4 Hz and 10 kHz.

7. The Bragg grating fiber hydrophone according to claim 1, further comprising a flexible and tight outer casing, surrounding a unit formed by the rigid casing and the hydrostatic filters, wherein the outer casing is filled with a fluid to transmit pressure variations external to the fluid cavity.

8. The Bragg grating fiber hydrophone according to claim 1, wherein the compressible fluid of the fluid cavity has a compressibility modulus lower than 1.5 Gpa.

9. The Bragg grating fiber hydrophone according to claim 2, further comprising at least one hydrostatic filter cooperating with the fluid cavity, each hydrostatic filter being provided with an orifice configured to provide a fluid communication between an inside and an outside of the fluid cavity.

10. The Bragg grating fiber hydrophone according to claim 2, wherein elements forming the hydrophone have a resonance frequency outside a frequency range comprised between 0.4 Hz and 10 kHz.

11. The Bragg grating fiber hydrophone according to claim 2, further comprising a flexible and tight outer casing, surrounding a unit formed by the rigid casing and the hydrostatic filters, wherein the outer casing is filled with a fluid to transmit pressure variations external to the fluid cavity.

12. The Bragg grating fiber hydrophone according to claim 2, wherein the compressible fluid of the fluid cavity has a compressibility modulus lower than 1.5 Gpa.

13. The Bragg grating fiber hydrophone according to claim 1, wherein the optical fiber has a sensitivity in a range of 3 to 4.5 nm/Mpa.

* * * * *